US012685966B2

(12) United States Patent (10) Patent No.: US 12,685,966 B2
Wu et al. (45) Date of Patent: Jul. 21, 2026

(54) CATALYST FOR THERMALLY STABLE DEGRADATION OF VOCS, PREPARATION METHOD THEREOF AND USE THEREOF

(71) Applicants: Zhejiang Tianlan Environmental Protection Technology Co., Ltd., Hangzhou (CN); Zhejiang University, Hangzhou (CN)

(72) Inventors: Zhongbiao Wu, Hangzhou (CN); Yemin Zhao, Hangzhou (CN); Shan Gao, Hangzhou (CN); Haibo Ni, Hangzhou (CN); Ziwei Zhou, Hangzhou (CN); Yuejun Wang, Hangzhou (CN); Zhongfei Zhang, Hangzhou (CN)

(73) Assignees: Zhejiang Tianlan Environmental Protection Technology Co., Ltd., Hangzhou (CN); Zhejiang University, Hangzhou (CN)

( * ) Notice: Subject to any disclaimer, the term of this patent is extended or adjusted under 35 U.S.C. 154(b) by 0 days.

(21) Appl. No.: 19/375,447

(22) Filed: Oct. 31, 2025

(65) Prior Publication Data

US 2026/0124580 A1 May 7, 2026

(30) Foreign Application Priority Data

Nov. 7, 2024 (CN) .......................... 202411584635.0

(51) Int. Cl.
| | |
|---|---|
| *B01D 53/86* | (2006.01) |
| *B01J 23/42* | (2006.01) |
| *B01J 23/44* | (2006.01) |
| *B01J 23/46* | (2006.01) |
| *B01J 35/00* | (2006.01) |
| *B01J 35/57* | (2024.01) |
| *B01J 37/00* | (2006.01) |
| *B01J 37/04* | (2006.01) |
| *B01J 37/08* | (2006.01) |

(52) U.S. Cl.
CPC ............ *B01D 53/864* (2013.01); *B01J 23/42* (2013.01); *B01J 23/44* (2013.01); *B01J 23/462* (2013.01); *B01J 35/19* (2024.01); *B01J 35/57* (2024.01); *B01J 37/0036* (2013.01); *B01J 37/04* (2013.01); *B01J 37/08* (2013.01); *B01D 2257/708* (2013.01)

(58) Field of Classification Search
None
See application file for complete search history.

(56) References Cited

FOREIGN PATENT DOCUMENTS

| | | | |
|---|---|---|---|
| CN | 101733165 A | 6/2010 | |
| CN | 111185221 A | 5/2020 | |
| CN | 113797961 A | 12/2021 | |
| GB | 2089671 A | * 6/1982 | .............. B01J 35/57 |

* cited by examiner

*Primary Examiner* — Daniel Berns
(74) *Attorney, Agent, or Firm* — Cooper Legal Group, LLC

(57) ABSTRACT

The present application discloses a catalyst for thermally stably degradation of VOCs, a preparation method thereof and a use thereof. The catalyst includes: a substrate, and an auxiliary agent and an active component which are on the substrate. The auxiliary agent includes a first auxiliary agent and a second auxiliary agent; the first auxiliary agent includes a cobalt-containing auxiliary agent and/or an iron-containing auxiliary agent; and the second auxiliary agent includes an aluminum-based auxiliary agent. The combination of specific first and second auxiliary agents is introduced into the catalyst of the present application, so that oxygen molecules can be quickly adsorbed and activated during the catalytic combustion process of VOCs with forming a catalytic synergy center with the active component, thereby improving the removal efficiency for VOCs and facilitating the long-term stable operation of the catalyst under harsh conditions such as high-temperature and high-humidity conditions.

12 Claims, No Drawings

1

CATALYST FOR THERMALLY STABLE DEGRADATION OF VOCS, PREPARATION METHOD THEREOF AND USE THEREOF

CROSS-REFERENCE TO RELATED APPLICATION

The present application claims the priority and benefit of Chinese patent application No. 202411584635.0, filed on Nov. 7, 2024. The entirety of Chinese patent application No. 202411584635.0 is hereby incorporated by reference herein and made a part of this specification.

TECHNICAL FIELD

The present application relates to the field of purification of VOCs and, in particular, to a catalyst for thermally stable degradation of VOCs, a preparation method thereof and a use thereof.

BACKGROUND ART

At present, among the various technologies for controlling VOCs emissions, catalytic combustion has become the mainstream purification technique thanks to its advantages such as high purification efficiency and low energy consumption. Palladium and platinum are generally used as active components of catalysts, and such catalysts have an effective service life of about 12-15 months. However, in working conditions with complex waste gas components and high moisture condition such as those in the pharmaceutical industry, chlor-alkali industry, and garbage/solid waste incineration, the lifespan of the catalysts is shortened to 5-7 months.

At the present stage, study conducted by different researchers on improving the performance of catalysts and extending the service life of catalysts mainly focuses on the reconstruction and dosage of notable metals. For example, CN111185221A discloses a PdAg alloy-supported Ti-SBA-15 catalyst and a preparation method therefor and use thereof. The catalyst was prepared by the steps of: dissolving surfactant P123 in hydrochloric acid and stirring at a temperature ranging from 30° C. to 150° C. to obtain a solution; adding tetraethyl orthosilicate and a Ti source dropwise to the above solution, stirring at a temperature of 30° C. to 150° C., then aging the obtained suspension A at a temperature of 40° C. to 150° C., and performing suction filtration, washing and drying, and then calcining at a temperature of 500-550° C. to prepare a Ti-SBA-15 support; dissolving a Pd precursor, an Ag precursor and the Ti-SBA-15 support in ultrapure water, stirring at room temperature to obtain suspension B, and then adding NaBH$_4$ solution, stirring the resulting solution, and performing suction filtration, washing and drying.

CN101733165A discloses a preparation method and for a low-content notable metal monolithic catalyst and a use of the low-content notable metal monolithic catalyst. The invention adopts an electroless plating method, in which hydrazine or sodium hypophosphite was used as a reducing agent to undergo an a redox reaction with palladium chloride or chloroplatinic acid in a plating solution and in the meanwhile, under the autocatalysis of Pd or Pt, metal Pd and/or Pt were directly deposited on the surface of honeycomb ceramic pores of cordierite, thus obtaining a supported monolithic catalyst with a low content of Pt and/or Pd noble metal.

CN113797961A discloses a RuCe/ZSM-5 molecular sieve catalyst, a preparation method therefor and a use thereof. A Na-ZSM-5 molecular sieve with a micro-mesoporous structure was synthesized hydrothermally and then transformed into H-ZSM-5 by means of ion exchange. Using H-ZSM-5 as a support, Ru and Ce precursor solutions were supported thereon by means of a citric acid sol-gel method, and then calcination was performed, thus obtaining the RuCe/ZSM-5 molecular sieve catalyst. The RuCe-ZSM-5 synthesized by hydrothermal crystallization method in this solution has a multi-stage pore structure, can effectively reduce the mass transfer resistance of chlorobenzene on the catalyst, has greatly improved chlorobenzene conversion performance with a chlorobenzene conversion rate of 98.4% at 275° C., and shows good resistance to chlorine poisoning. However, the molecular sieve has poor hydrothermal stability and the microscopically ordered morphology and structure thereof are prone to collapse in high-temperature and high-humidity environments, which hinders the catalysts from operating for a long time in the above-mentioned environments. In addition, with a high degree of order, few surface defects, and weak interaction with notable metals, the molecular sieve support fails to form a strong metal-support interaction and can hardly prevent the clustering or granulation of notable metal ions at high temperatures.

In summary, it can be seen that existing catalysts for degrading VOCs still suffer from low catalytic efficiency and short lifetime under high-temperature and high-humidity conditions.

SUMMARY

In view of the problems existing in the prior art, an object of the present application is to provide a catalyst for thermally stable degradation of VOCs, a preparation method thereof and a use thereof, so as to solve the problem that catalysts for degrading VOCs still have the defects of poor catalytic efficiency and short service life in high-temperature and high-humidity environments.

In order to achieve the above object, the present application adopts the following technical solutions:

In a first aspect, the present application provides a catalyst for thermally stable degradation of VOCs. The catalyst includes: a substrate, and an auxiliary agent and an active component which are on the substrate;

the auxiliary agent includes a first auxiliary agent and a second auxiliary agent;

the first auxiliary agent includes at least one of a cobalt-containing auxiliary agent or an iron-containing auxiliary agent; and the second auxiliary agent includes an aluminum-based auxiliary agent.

The combination of specific first and second auxiliary agents is introduced into the catalyst of the present application, so that oxygen molecules can be quickly adsorbed and activated during the catalytic oxidation process of VOCs with forming a catalytic synergy center with the active component, thereby improving the removal efficiency for VOCs and facilitating the long-term stable operation of the catalyst under harsh conditions such as high-temperature and high-humidity conditions.

As a preferred technical solution of the present application, a content of an active element of the first auxiliary agent is 0.2% to 8% of a total mass of the catalyst.

Preferably, the active element includes at least one of cobalt or iron.

As a preferred technical solution of the present application, a content of the active component is 0.002% to 1.5% of the total mass of the catalyst.

As a preferred technical solution of the present application, the substrate includes at least one of honeycomb mullite or honeycomb cordierite.

Preferably, the first auxiliary agent includes at least one of $Co_3O_4$, $CoO$, $Fe_3O_4$ or $Fe_2O_3$.

Preferably, the second auxiliary agent includes at least one of $Al_2O_3$ or pseudoboehmite.

As a preferred technical solution of the present application, the active component includes o at least one of platinum, ruthenium or palladium.

In a second aspect, the present application provides a method for preparing the catalyst according to the first aspect. The method includes: performing first stirring and mixing on a first auxiliary agent dispersion liquid and a second auxiliary agent dispersion liquid to obtain a first mixture, and then performing first calcination on the first mixture to obtain a composite auxiliary agent;

performing second stirring and mixing on the composite auxiliary agent and an active component dispersion liquid to obtain a second mixture, and then performing second calcination on the second mixture to obtain a catalyst composite powder;

performing ball milling on the catalyst composite powder, the second auxiliary agent and a concentrated acid to obtain a gelled mixture; and combining the gelled mixture with the substrate, and then performing third calcination to obtain the catalyst for thermally stable degradation of VOCs.

As a preferred technical solution of the present application, the first auxiliary agent dispersion liquid is obtained by dispersing the first auxiliary agent in a first solvent.

Preferably, the second auxiliary agent dispersion liquid is obtained by dispersing the second auxiliary agent in a second solvent.

As a preferred technical solution of the present application, a mass ratio of the first auxiliary agent in the first auxiliary agent dispersion liquid to the second auxiliary agent in the second auxiliary agent dispersion liquid is (0.1-0.4):1.

As a preferred technical solution of the present application, a temperature of the first calcination is 600° C. to 850° C.

Preferably, a time of the first calcination is 2 h to 10 h.

As a preferred technical solution of the present application, the active component dispersion liquid is obtained by dispersing an active substance in a third solvent.

Preferably, the active substance includes at least one of platinum nitrate, tetraammine platinum nitrate, chloroplatinic acid, tetraammine platinum chloride, ruthenium chloride, ruthenium nitrosyl nitrate, palladium chloride, palladium nitrate or tetraammine palladium nitrate.

As a preferred technical solution of the present application, a mass ratio of the composite auxiliary agent to the active substance in the active component dispersion liquid is 1:(0.01-0.5).

As a preferred technical solution of the present application, a temperature of the second calcination is 400° C. to 600° C.

Preferably, a time of the second calcination is 1 h to 5 h.

As a preferred technical solution of the present application, a mass ratio of the concentrated acid to the second auxiliary agent during the ball milling is (0.01-0.08):1.

Preferably, a mass ratio of the second auxiliary agent to the catalyst composite powder during the ball milling is (0.05-0.5):1.

As a preferred technical solution of the present application, a time of the ball milling is 30 min to 120 min.

Preferably, a mass ratio of grinding balls to materials during the ball milling is (2-20):1.

As a preferred technical solution of the present application, a temperature of the third calcination is 400° C. to 600° C.

Preferably, a time of the third calcination is 1 h to 5 h.

In a third aspect, the present application provides a use of the catalyst according to the first aspect. The use includes using the catalyst for catalytic combustion of the volatile organic compounds.

As a preferred technical solution of the present application, the volatile organic compounds include at least one of toluene, propylene or xylene;

preferably, a water vapor content in the volatile organic compounds is at least 5%.

Compared with the prior art solution, the present application has the following beneficial effects:

(1) A multi-effect composite auxiliary agent is formed by means of solid-solid dual-phase high-temperature rapid coupling between the first auxiliary agent and the second auxiliary agent. The composite auxiliary agent has the characteristics of high-temperature sintering resistance, strong bonding of active components, enhanced synergistic catalysis, etc. The composite auxiliary agent can provide a large number of bonding points and bond with noble metals by means of strong action to form various types of noble metal-oxygen-transition metal structures, stabilizing the active component. Oxygen vacancies in the multi-effect composite auxiliary agent can also quickly adsorb and activate oxygen molecules during the reaction, forming a catalytic synergy center with the active component, increasing the unit conversion rate of VOCs and carbon monoxide, and achieving long-term stable operation under harsh conditions such as high-temperature and high-humidity conditions.

(2) By directly gelling and modifying the second auxiliary agent, the addition of sol containing other components can be reduced. Moreover, the modified second auxiliary agent is then subjected to ball milling together with the catalyst composite powder for secondary performance enhancement, thereby improving the homogeneity and integration of the solid-liquid phases, ultimately overcoming the problem of localized gap expansion in the coating, caused by low component compatibility and poor homogeneity of the composite powder and the sol agent during the high-temperature curing stage, further enhancing the hydrothermal stability of the catalyst and extending the service life of the catalyst under high-humidity flue gas conditions. In the absence of water vapor, the catalytic efficiency can reach 98.6% or above. When the moisture content of water vapor in volume percentage is 5%, the catalyst still has a high catalytic efficiency of 93.8% or above, and the coating shedding rate during the catalytic combustion process is at most 9.8%.

DETAILED DESCRIPTION

In order to better illustrate the present application and facilitate understanding of the technical solutions of the present application, a typical but non-limiting embodiment of the present application is as follows:

This embodiment provides a catalyst for thermally stable degradation of VOCs. The catalyst includes: a substrate, and an auxiliary agent and an active component which are on the substrate; wherein the auxiliary agent includes a first auxiliary agent and a second auxiliary agent;

the first auxiliary agent includes at least one of a cobalt-containing auxiliary agent or an iron-containing auxiliary agent; and the second auxiliary agent includes an aluminum-based auxiliary agent.

A content of an active element of the first auxiliary agent is 0.2% to 8% of a total mass of the catalyst. The content of the active element may be, for example, 0.2%, 0.4%, 0.6%, 0.8%, 1%, 1.5%, 2%, 2.5%, 3%, 3.5%, 4%, 4.5%, 5%, 5.5%, 6%, 6.5%, 7%, 7.5% or 8%, etc., but is not limited to the values listed, and other unlisted values within this range also meet the requirements.

The active element includes at least one of cobalt or iron.

A content of the active component is 0.002% to 1.5% of the total mass of the catalyst. The content of the active component may be, for example, 0.002%, 0.004%, 0.006%, 0.008%, 0.01%, 0.02%, 0.04%, 0.06%, 0.08%, 0.1%, 0.2%, 0.4%, 0.6%, 0.8%, 1%, 1.2%, 1.4% or 1.5%, etc., but is not limited to the values listed, and other unlisted values within this range also meet the requirements.

The substrate includes at least one of honeycomb mullite or honeycomb cordierite.

The first auxiliary agent includes at least one of $Co_3O_4$, CoO, $Fe_3O_4$ or $Fe_2O_3$.

Illustratively, the first auxiliary agent is, for example, a combination of $CO_3O_4$ and CoO, a combination of CoO and $Fe_3O_4$, a combination of $Fe_3O_4$ and $Fe_2O_3$, a combination of CoO and $Fe_3O_4$, and the like.

The second auxiliary agent includes at least one of $Al_2O_3$ or pseudoboehmite.

The active component includes at least one of platinum, ruthenium or palladium.

Illustratively, the active component may be selected to be a combination of platinum and ruthenium, a combination of ruthenium and palladium, a combination of platinum and palladium, etc.

Further, the present application provides a method for preparing the catalyst described above. The method includes:

performing first stirring and mixing on a first auxiliary agent dispersion liquid and a second auxiliary agent dispersion liquid to obtain a first mixture, and then performing first calcination on the first mixture to obtain a composite auxiliary agent;

performing second stirring and mixing on the composite auxiliary agent and an active component dispersion liquid to obtain a second mixture, and then performing second calcination on the second mixture to obtain a catalyst composite powder;

performing ball milling on the catalyst composite powder, the second auxiliary agent and a concentrated acid to obtain a gelled mixture; and combining the gelled mixture with the substrate, and then performing third calcination to obtain the catalyst for thermally stable degradation of VOCs.

The first auxiliary agent dispersion liquid is obtained by dispersing the first auxiliary agent in a first solvent.

In the present application, the first auxiliary agent used in the preparation process is a metal powder such as $Co_3O_4$, CoO, $Fe_3O_4$, or $Fe_2O_3$.

The second auxiliary agent dispersion liquid is obtained by dispersing the second auxiliary agent in a second solvent.

In the present application, the second auxiliary agent used in the preparation process is a powder of $Al_2O_3$ and/or pseudoboehmite, etc.

A mass ratio of the first auxiliary agent in the first auxiliary agent dispersion liquid to the second auxiliary agent in the second auxiliary agent dispersion liquid is (0.1-0.4):1. The mass ratio may be, for example, 0.1:1, 0.12:1, 0.14:1, 0.16:1, 0.18:1, 0.2:1, 0.22:1, 0.24:1, 0.26:1, 0.28:1, 0.3:1, 0.32:1, 0.34:1, 0.36:1, 0.38:1 or 0.4:1, etc., but is not limited to the values listed, and other unlisted values within this range also meet the requirements.

A temperature of the first calcination is 600° C. to 850° C. The temperature may be, for example, 600° C., 620° C., 640° C., 660° C., 680° C., 700° C., 720° C., 740° C., 760° C., 780° C., 800° C., 820° C., 840° C. or 850° C., etc., but is not limited to the values listed, and other unlisted values within this range also meet the requirements.

A time of the first calcination is 2 h to 10 h. The time may be, for example, 2 h, 2.5 h, 3 h, 3.5 h, 4 h, 4.5 h, 5 h, 5.5 h, 6 h, 6.5 h, 7 h, 7.5 h, 8 h, 8.5 h, 9 h, 9.5 h or 10 h, etc., but is not limited to the values listed, and other unlisted values within this range also meet the requirements.

The active component dispersion liquid is obtained by dispersing an active substance in a third solvent.

The active substance includes at least one of platinum nitrate, tetraammine platinum nitrate, chloroplatinic acid, tetraammine platinum chloride, ruthenium chloride, ruthenium nitrosyl nitrate, palladium chloride, palladium nitrate or tetraammine palladium nitrate.

Illustratively, the active substance includes a combination of platinum nitrate and tetraammine platinum nitrate, a combination of chloroplatinic acid and tetraammine platinum chloride, a combination of tetraammine platinum chloride and ruthenium chloride, a combination of ruthenium nitrosyl nitrate and palladium chloride, a combination of palladium nitrate and tetraammine palladium nitrate, a combinations of chloroplatinic acid and ruthenium nitrosyl nitrate, and a combination of tetraammine platinum nitrate and palladium nitrate.

A mass ratio of the composite auxiliary agent to the active substance in the active ingredient dispersion liquid is 1:(0.01-0.5). The mass ratio may be, for example, 1:0.01, 1:0.02, 1:0.03, 1:0.04, 1:0.05, 1:0.06, 1:0.07, 1:0.08, 1:0.09, 1:0.1, 1:0.15, 1:0.2, 1:0.25, 1:0.3, 1:0.35, 1:0.4, 1:0.45 or 1:0.5, etc., but is not limited to the values listed, and other unlisted values within this range also meet the requirements.

A temperature of the second calcination is 400° C. to 600° C. The temperature may be, for example, 400° C., 420° C., 440° C., 460° C., 480° C., 500° C., 520° C., 540° C., 560° C., 580° C. or 600° C., etc., but is not limited to the listed values, and other unlisted values within this range also meet the requirements.

A time of the second calcination is 1 h to 5 h. The time may be, for example, 1 h, 1.5 h, 2 h, 2.5 h, 3 h, 3.5 h, 4 h, 4.5 h or 5 h, etc., but is not limited to the listed values, and other unlisted values within this range also meet the requirements.

A mass ratio of the concentrated acid to the second auxiliary agent during the ball milling is (0.01-0.08):1. The mass ratio may be, for example, 0.01:1, 0.015:1, 0.02:1, 0.025:1, 0.03:1, 0.035:1, 0.04:1, 0.045:1, 0.05:1, 0.055:1, 0.06:1, 0.065:1, 0.07:1, 0.075:1 or 0.08:1, etc., but is not limited to the values listed, and other unlisted values within this range also meet the requirements.

In the present application, the concentrated acid used during the ball milling may be selected to be concentrated nitric acid, concentrated sulfuric acid, concentrated hydrochloric acid or other concentrated acids commonly used in the art.

A mass ratio of the second auxiliary agent to the catalyst composite powder during the ball milling is (0.05-0.5):1. The mass ratio may be, for example, 0.05:1, 0.06:1, 0.07:1, 0.08:1, 0.09:1, 0.1:1, 0.15:1, 0.2:1, 0.25:1, 0.3:1, 0.35:1, 0.4:1, 0.45:1 or 0.5:1, etc., but is not limited to the values listed, and other unlisted values within this range also meet the requirements.

A time of the ball milling is 30 min to 120 min. The time may be, for example, 30 min, 40 min, 50 min, 60 min, 70 min, 80 min, 90 min, 100 min, 110 min or 120 min, etc., but is not limited to the values listed, and other unlisted values within this range also meet the requirements.

A mass ratio of grinding balls to materials during the ball milling is (2-20):1, and the materials are a mixture of the catalyst composite powder, the second auxiliary agent during the ball milling and the concentrated acid. The mass ratio may be, for example, 2:1, 4:1, 6:1, 8:1, 10:1, 12:1, 14:1, 16:1, 18:1 or 20:1, etc., but is not limited to the values listed, and other unlisted values within this range also meet the requirements.

A temperature of the third calcination is 400° C. to 600° C. The temperature may be, for example, 400° C., 420° C., 440° C., 460° C., 480° C., 500° C., 520° C., 540° C., 560° C., 580° C. or 600° C., etc., but is not limited to the listed values, and other unlisted values within this range also meet the requirements.

A time of the third calcination is 1 h to 5 h. The time may be, for example, 1 h, 1.5 h, 2 h, 2.5 h, 3 h, 3.5 h, 4 h, 4.5 h or 5 h, etc., but is not limited to the listed values, and other unlisted values within this range also meet the requirements.

In the present application, the dispersion methods during the preparation process include but are not limited to stirring, ultrasound, shearing and other methods commonly used in the art for dispersing solids in liquids.

In the present application, during the preparation process, the first solvent, the second solvent and the third solvent used may be solvents commonly used in the art, such as water.

In the present application, before use, the substrate of the catalyst may be soaked in an acid solution with a mass concentration of 5% to 10% for 30 min to 60 min, and then optionally washed and dried for later use.

The acid solution used in the soaking treatment includes nitric acid and/or sulfuric acid.

Further, the present application provides a use of the catalyst described above. The use includes using the catalyst for catalytic combustion of the volatile organic compounds.

The volatile organic compounds include at least one of toluene, propylene or xylene.

A water vapor content in the volatile organic compounds is at least 5%.

In order to illustrate the high catalytic efficiency that the catalyst of the present application can achieve for the degradation of volatile organic compounds, the present application uses practical examples for explanation, which are specified as follows:

Example 1

This example provides a catalyst for thermally stable degradation of VOCs. The preparation process of the catalyst was as follows:

(1) Honeycomb cordierite was soaked in a 5 wt % dilute nitric acid solution for 30 min, then washed twice with deionized water, and dried at 120° C. for 2 h to obtain a pretreated catalyst substrate for later use.

(2) 4 g of a first auxiliary agent, CoO, was dispersed in 100 g of deionized water by stirring to obtain a first auxiliary agent dispersion liquid; 28 g of a second auxiliary agent, $Al_2O_3$, was dispersed in 100 g of deionized water by stirring to obtain a second auxiliary agent dispersion liquid; the second auxiliary agent dispersion liquid was poured into the first auxiliary agent dispersion liquid and a resulting mixture was then stirred for 30 min and dried at 120° C., and finally calcined at 800° C. for 4 h to obtain a composite auxiliary agent.

(3) 30 g of the composite auxiliary agent was dispersed in 100 g of deionized water to obtain a mixed solution; 2 g of palladium nitrate was dissolved in 5 g of deionized water by stirring to obtain an active component dispersion liquid (a mass concentration of palladium element was 15 wt %); then, the active component dispersion liquid was added to the mixed solution and a resulting mixture was stirred, dried at 120° C., and finally calcined at 450° C. for 3 h to obtain the catalyst composite powder.

(4) 3 g of a second auxiliary agent, pseudoboehmite, and 0.2 g of concentrated nitric acid were added into 100 g of deionized water and well stirred, and then 20 g of the catalyst composite powder was added, and a resulting mixture was ball milled for 60 min to obtain a gelled mixed solution. The catalyst substrate from step (1) was immersed in the gelled mixed solution, followed by negative-pressure coating, drying at 120° C., and final calcination at 450° C. for 2 h to obtain a monolithic catalyst.

Example 2

This example provides a catalyst for thermally stable degradation of VOCs. The preparation process of the catalyst was as follows:

(1) Honeycomb cordierite was soaked in a 5 wt % dilute nitric acid solution for 30 min, then washed twice with deionized water, and dried at 120° C. for 2 h to obtain a pretreated catalyst substrate for later use.

(2) 4 g of a first auxiliary agent, CoO, was dispersed in 100 g of deionized water by stirring to obtain a first auxiliary agent dispersion liquid; 28 g of a second auxiliary agent, $Al_2O_3$, was dispersed in 100 g of deionized water by stirring to obtain a second auxiliary agent dispersion liquid; the second auxiliary agent dispersion liquid was poured into the first auxiliary agent dispersion liquid and a resulting mixture was then stirred for 30 min and dried at 120° C., and finally calcined at a high temperature of 800° C. for 4 h to obtain a composite auxiliary agent.

(3) 30 g of the composite auxiliary agent was dispersed in 100 g of deionized water to obtain a mixed solution; 3 g of platinum nitrate was dissolved in 5 g of deionized water by stirring to obtain an active component dispersion liquid (a mass concentration of platinum element was 10 wt %); then, the active component dispersion liquid was added to the mixed solution and a resulting mixture was stirred, dried at 120° C., and finally calcined at 450° C. for 3 h to obtain the catalyst composite powder.

(4) 3 g of a second auxiliary agent, pseudoboehmite, and 0.2 g of concentrated nitric acid were added into 100 g of deionized water and well stirred, and then 20 g of the catalyst composite powder was added, and a resulting mixture was ball milled for 60 min to obtain a gelled mixed solution. The catalyst substrate from step (1) was immersed in the gelled mixed solution, followed by negative-pressure coating, drying at 120° C., and final calcination at 450° C. for 3 h to obtain a monolithic catalyst.

Example 3

This example provides a catalyst for thermally stable degradation of VOCs. The preparation process of the catalyst is as follows:

(1) Honeycomb cordierite was soaked in a 5 wt % dilute nitric acid solution for 30 min, then washed twice with deionized water, and dried at 120° C. for 2 h to obtain a pretreated catalyst substrate for later use.

(2) 4 g of a first auxiliary agent, $Fe_2O_3$, was dispersed in 100 g of deionized water by stirring to obtain a first auxiliary agent dispersion liquid; 28 g of a second auxiliary agent, $Al_2O_3$, was dispersed in 100 g of deionized water by stirring to obtain a second auxiliary agent dispersion liquid; the second auxiliary agent dispersion liquid was poured into the first auxiliary agent dispersion liquid and a resulting mixture was then stirred for 30 min and dried at 120° C., and finally calcined at a high temperature of 850° C. for 4 h to obtain a composite auxiliary agent.

(3) 30 g of the composite auxiliary agent was dispersed in 100 g of deionized water to obtain a mixed solution; 3 g of palladium nitrate was dissolved in 5 g of deionized water by stirring to obtain an active component dispersion liquid (a mass concentration of palladium element was 10 wt %); then, the active component dispersion liquid was added to the mixed solution and a resulting mixture was stirred, dried at 120° C., and finally calcined at 450° C. for 2.5 h to obtain the catalyst composite powder.

(4) 3 g of a second auxiliary agent, pseudoboehmite, and 0.2 g of concentrated nitric acid were added into 100 g of deionized water and well stirred, and then 20 g of the catalyst composite powder was added, and a resulting mixture was ball milled for 60 min to obtain a gelled mixed solution. The catalyst substrate from step (1) was immersed in the gelled mixed solution, followed by negative-pressure coating, drying at 120° C., and final calcination at 450° C. for 3 h to obtain a monolithic catalyst.

Example 4

This example provides a catalyst for thermally stable degradation of VOCs. The preparation process of the catalyst was as follows:

(1) Honeycomb cordierite was soaked in a 5 wt % dilute nitric acid solution for 30 min, then washed twice with deionized water, and dried at 120° C. for 2 h to obtain a pretreated catalyst substrate for later use.

(2) 4 g of a first auxiliary agent, CoO, was dispersed in 100 g of deionized water by stirring to obtain a first auxiliary agent dispersion liquid; 28 g of a second auxiliary agent, $Al_2O_3$, was dispersed in 100 g of deionized water by stirring to obtain a second auxiliary agent dispersion liquid; the second auxiliary agent dispersion liquid was poured into the first auxiliary agent dispersion liquid and a resulting mixture was then stirred for 30 min and dried at 120° C., and finally calcined at a high temperature of 800° C. for 4 h to obtain a composite auxiliary agent.

(3) 30 g of the composite auxiliary agent was dispersed in 100 g of deionized water to obtain a mixed solution; 3 g of platinum nitrate was dissolved in 5 g of deionized water by stirring to obtain an active component dispersion liquid (a mass concentration of platinum element was 10 wt %); then, the active component dispersion liquid was added to the mixed solution and a resulting mixture was stirred, dried at 120° C., and finally calcined at 450° C. for 2.5 h to obtain the catalyst composite powder.

(4) 3 g of a second auxiliary agent, pseudoboehmite, and 0.2 g of concentrated nitric acid were added into 100 g of deionized water and well stirred, and then 20 g of the catalyst composite powder was added, and a resulting mixture was ball milled for 60 min to obtain a gelled mixed solution. The catalyst substrate from step (1) was immersed in the gelled mixed solution, followed by negative-pressure coating, drying at 120° C., and final calcination at 450° C. for 2.5 h to obtain a monolithic catalyst.

Comparative Example 1

This comparative example is the same as Example 1 except that the first auxiliary agent in step (2) was replaced with an equal amount of the second auxiliary agent ($Al_2O_3$).

Comparative Example 2

This comparative example is the same as Example 1 except that the second auxiliary agent in step (2) was replaced with an equal amount of the first auxiliary agent.

Comparative Example 3

This comparative example is the same as Example 1 except that the second auxiliary agent in step (4) was replaced with an equal amount of the first auxiliary agent.

Comparative Example 4

This comparative example is the same as Example 1 except that the second auxiliary agents in steps (2) and (4) were all replaced with equal amounts of the first auxiliary agents.

Comparative Example 5

This comparative example is the same as Example 1 except that the first auxiliary agent in step (2) was replaced with an equal amount of $Cr_2O_3$.

Comparative Example 6

This comparative example is the same as Example 1 except that the second auxiliary agents in steps (2) and (4) were all replaced with equal amounts of $Cr_2O_3$.

Comparative Example 7

This comparative example is the same as Example 1 except that palladium nitrate was not added in step (3).

Comparative Example 8

This comparative example is the same as Example 1 except that concentrated nitric acid and pseudoboehmite were not added in step (4), that is, no gelling was performed.

The catalysts obtained in Examples and Comparative Examples were used for catalytic combustion of VOCs at a space velocity of 15000 h$^{-1}$, and water vapor contents of 0 and 5%. The coating shedding rate refers to the percentage of the area on the substrate where auxiliary agents and active components were shed off to the total area in contact with the auxiliary agents and the active components. See Table 1 for the treatment results.

TABLE 1

| | Purification object | Water vapor content | Catalytic efficiency/% | Coating shedding rate/% |
|---|---|---|---|---|
| Example 1 | Propylene | 0 | 99.7 | 8.3 |
| | | 5% | 95.6 | |
| Example 2 | Xylene | 0 | 99.9 | 8.6 |
| | | 5% | 94.9 | |
| Example 3 | Toluene | 0 | 98.9 | 9.8 |
| | | 5% | 93.8 | |
| Example 4 | Toluene | 0 | 98.6 | 9.5 |
| | | 5% | 96.2 | |
| Comparative Example 1 | Toluene | 0 | 88.4 | 11.3 |
| | | 5% | 85.6 | |
| Comparative Example 2 | Toluene | 0 | 87.3 | 12.1 |
| | | 5% | 82.4 | |
| Comparative Example 3 | Toluene | 0 | 89.6 | 23.7 |
| | | 5% | 87.7 | |
| Comparative Example 4 | Toluene | 0 | 90.1 | 25.8 |
| | | 5% | 86.5 | |
| Comparative Example 5 | Toluene | 0 | 89.1 | 10.6 |
| | | 5% | 87.1 | |
| Comparative Example 6 | Toluene | 0 | 91.3 | 26.6 |
| | | 5% | 88.9 | |
| Comparative Example 7 | Toluene | 0 | 45.9 | 10.2 |
| | | 5% | 34.6 | |
| Comparative Example 8 | Toluene | 0 | 96.3 | 28.9 |
| | | 5% | 92.1 | |

It can be seen from Table 1 that in the solutions of the present application, a multi-effect composite auxiliary agent is formed by means of solid-solid dual-phase high-temperature rapid coupling between the first auxiliary agent and the second auxiliary agent. The composite auxiliary agent has the characteristics of high-temperature sintering resistance, strong bonding of active components, enhanced synergistic catalysis, etc. The composite auxiliary agent can provide a large number of bonding points and bond with noble metals by means of strong action to form various types of noble metal-oxygen-transition metal structures, stabilizing the active component. Oxygen vacancies in the multi-effect composite auxiliary agent can also quickly adsorb and activate oxygen molecules during the reaction, forming a catalytic synergy center with the active component, increasing the conversion rate of VOCs. In addition, by directly gelling and modifying the second auxiliary agent, the addition of sol containing other components can be reduced. Moreover, the modified second auxiliary agent is then subjected to ball milling together with the catalyst composite powder for secondary performance enhancement, thereby improving the homogeneity and integration of the solid-liquid phases, ultimately overcoming the problem of localized gap expansion in the coating, caused by low component compatibility and poor homogeneity of the composite powder and the sol agent during the high-temperature curing stage, and further enhancing the hydrothermal stability of the catalyst.

It should be stated that the invention illustrates the detailed structural features of the invention by way of the above embodiments, but the present application is not limited to the above detailed structural features. That is, it does not mean that the implementation of the invention must rely on the above-mentioned detailed structural features. Those skilled in the art should understand that any improvements to the invention, equivalent replacements of used parts of the invention, addition of accessories, selection of specific methods, etc., fall within the scope and disclosure of the invention.

The preferred embodiments of the invention are described in detail above, but the invention is not limited to the specific details in the embodiments described above. Within the scope of the technical concept of the invention, various simple modifications can be made to the technical solutions of the invention, and all these simple modifications fall within the scope of the invention.

In addition, it should be noted that the specific technical features described in the specific embodiments described above can be combined in any in any appropriate manner without contradiction. In order to avoid unnecessary repetition, the invention does not provide additional descriptions for all possible combinations.

In addition, various different embodiments of the invention can also be combined in any way, without departing from the spirit of the invention. Such combinations shall also be deemed as the content disclosed by the invention.

What is claimed is:

1. A catalyst for thermally stable degradation of volatile organic compounds (VOCs), comprising a substrate, and an auxiliary agent and an active component which are on the substrate, wherein the auxiliary agent comprises a first auxiliary agent and a second auxiliary agent;

the first auxiliary agent comprises at least one of a cobalt-containing auxiliary agent or an iron-containing auxiliary agent;

the second auxiliary agent comprises an aluminum-based auxiliary agent;

a content of an active element of the first auxiliary agent is 2% to 8% of a total mass of the catalyst;

the active element comprises at least one of cobalt or iron;

the active component comprises at least one of platinum, ruthenium or palladium;

a content of the active component is 0.002% to 0.1% of the total mass of the catalyst; and the VOCs comprise at least one of toluene, propylene or xylene.

2. The catalyst according to claim 1, wherein the substrate comprises at least one of honeycomb mullite or honeycomb cordierite;

the first auxiliary agent comprises at least one of $Co_3O_4$, $CoO$, $Fe_3O_4$ or $Fe_2O_3$; and the second auxiliary agent comprises at least one of $Al_2O_3$ or pseudoboehmite.

3. A method for preparing the catalyst according to claim 1, comprising:

performing first stirring and mixing on a first auxiliary agent dispersion liquid and a second auxiliary agent dispersion liquid to obtain a first mixture, and then performing first calcination on the first mixture to obtain a composite auxiliary agent, wherein:

the first auxiliary agent dispersion liquid is obtained by dispersing the first auxiliary agent in a first solvent; and the second auxiliary agent dispersion liquid is obtained by dispersing a first portion of the second auxiliary agent in a second solvent;

performing second stirring and mixing on the composite auxiliary agent and an active component dispersion liquid to obtain a second mixture, and then performing second calcination on the second mixture to obtain a catalyst composite powder;

performing ball milling on the catalyst composite powder, a second portion of the second auxiliary agent and a concentrated acid to obtain a gelled mixture; and combining the gelled mixture with the substrate, and then performing third calcination to obtain the catalyst for thermally stable degradation of the VOCs.

4. The method according to claim 3, wherein a mass ratio of the first auxiliary agent in the first auxiliary agent dispersion liquid to the first portion of the second auxiliary agent in the second auxiliary agent dispersion liquid is (0.1-0.4):1.

5. The method according to claim 3, wherein a temperature of the first calcination is 600° C. to 850° C.; and a time of the first calcination is 2 h to 10 h.

6. The method according to claim 3, wherein the active component dispersion liquid is obtained by dispersing an active substance in a third solvent; and the active substance comprises at least one of platinum nitrate, tetraammine platinum nitrate, chloroplatinic acid, tetraammine platinum chloride, ruthenium chlo-
ride, ruthenium nitrosyl nitrate, palladium chloride, palladium nitrate or tetraammine palladium nitrate.

7. The method according to claim 6, wherein a mass ratio of the composite auxiliary agent to the active substance in the active component dispersion liquid is 1:(0.01-0.5).

8. The method according to claim 3, wherein a temperature of the second calcination is 400° C. to 600° C.; and a time of the second calcination is 1 h to 5 h.

9. The method according to claim 3, wherein a mass ratio of the concentrated acid to the second portion of the second auxiliary agent during the ball milling is (0.01-0.08):1; and a mass ratio of the second portion of the second auxiliary agent to the catalyst composite powder during the ball milling is (0.05-0.5):1.

10. The method according to claim 3, wherein a time of the ball milling is 30 min to 120 min.

11. The method according to claim 10, wherein a mass ratio of grinding balls to materials during the ball milling is (2-20):1.

12. The method according to claim 3, wherein a temperature of the third calcination is 400° C. to 600° C.; and a time of the third calcination is 1 h to 5 h.

* * * * *